(12) United States Patent
Hsiao et al.

(10) Patent No.: US 12,122,687 B2
(45) Date of Patent: Oct. 22, 2024

(54) METHOD FOR NITROGEN REMOVAL AND NITROGEN SALTS RECOVERY USING CARBOXYLATED CELLULOSE EXTRACTED BY NITRO-OXIDATION

(71) Applicant: The Research Foundation for The State University of New York, Albany, NY (US)

(72) Inventors: Benjamin S. Hsiao, Setauket, NY (US); Priyanka Sharma, East Setauket, NY (US); Sunil Kumar Sharma, East Setauket, NY (US); Ken I. Johnson, Port Jefferson Station, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 699 days.

(21) Appl. No.: 17/267,683

(22) PCT Filed: Aug. 28, 2019

(86) PCT No.: PCT/US2019/048603
§ 371 (c)(1),
(2) Date: Feb. 10, 2021

(87) PCT Pub. No.: WO2020/047122
PCT Pub. Date: Mar. 5, 2020

(65) Prior Publication Data
US 2021/0317010 A1 Oct. 14, 2021

Related U.S. Application Data

(60) Provisional application No. 62/724,129, filed on Aug. 29, 2018.

(51) Int. Cl.
C02F 1/28 (2023.01)
B01J 20/24 (2006.01)
(Continued)

(52) U.S. Cl.
CPC ............ *C02F 1/286* (2013.01); *B01J 20/24* (2013.01); *B01J 20/28023* (2013.01);
(Continued)

(58) Field of Classification Search
None
See application file for complete search history.

(56) References Cited

U.S. PATENT DOCUMENTS

| | | | |
|---|---|---|---|
| 6,903,064 | B1 | 6/2005 | Kasturi et al. |
| 2003/0172697 | A1 | 9/2003 | Sower |

(Continued)

FOREIGN PATENT DOCUMENTS

| | | | |
|---|---|---|---|
| CA | 2693298 A1 | 11/2000 | |
| CA | 2821789 A1 | 6/2012 | |

(Continued)

OTHER PUBLICATIONS

Wang, Xinggang, et al., "Recovery of Ammonium and Phosphate from Wastewater by Wheat Straw-Based Amphoteric Adsorbent and Reusing as a Multifunctional Slow-Release Compound Fertilizer," ACS Sustainable Chemistry & Engineering, vol. 4, No. 4, pp. 2068-2079 (2016). DOI: 10.1021/acssuschemeng.5b01494.

(Continued)

*Primary Examiner* — Richard C Gurtowski
(74) *Attorney, Agent, or Firm* — Hoffmann & Baron LLP

(57) ABSTRACT

A method of treating contaminated water, such as wastewater, with carboxylated cellulose to remove ammonium and nitrogen-containing impurities is claimed. Carboxylated cellulose extracted by nitro-oxidation has negatively-charged functionality and forms an aggregate when exposed to positively-charged impurities in contaminated water. The aggregate, nitrogen-containing impurities, and by-products from the nitro-oxidation process can be isolated to provide a fertilizer or fertilizer component.

15 Claims, 6 Drawing Sheets

(51) Int. Cl.
  *B01J 20/28* (2006.01)
  *C05F 7/00* (2006.01)
  *C02F 101/16* (2006.01)

(52) U.S. Cl.
  CPC ......... *C05F 7/00* (2013.01); *B01J 2220/4831* (2013.01); *C02F 2101/16* (2013.01); *C02F 2303/16* (2013.01)

(56) References Cited

U.S. PATENT DOCUMENTS

| | | | |
|---|---|---|---|
| 2006/0186050 A1* | 8/2006 | Hanes | B01J 20/28052 210/670 |
| 2011/0020954 A1* | 1/2011 | Shiomi | C08L 1/286 536/56 |
| 2011/0309017 A1 | 12/2011 | Hassler et al. | |
| 2013/0261032 A1 | 10/2013 | Ladva et al. | |
| 2014/0374104 A1 | 12/2014 | Seth | |
| 2015/0013987 A1 | 1/2015 | Underwood et al. | |
| 2016/0289704 A1 | 10/2016 | Medoff | |
| 2017/0359001 A1* | 12/2017 | Wang | C23C 16/045 |
| 2018/0015194 A1* | 1/2018 | Sone | B01J 20/3236 |
| 2018/0086851 A1 | 3/2018 | Hsiao et al. | |
| 2019/0084843 A1 | 3/2019 | Moller et al. | |

FOREIGN PATENT DOCUMENTS

| | | |
|---|---|---|
| EP | 2397534 A1 | 12/2011 |
| GB | 2332442 A | 6/1999 |
| JP | 2007016031 A | 1/2007 |
| JP | 2016128164 A | 7/2016 |
| MX | 2013006797 A | 9/2013 |
| WO | 9826039 A1 | 6/1998 |
| WO | 0051655 A1 | 8/2000 |
| WO | 2015112671 A1 | 7/2015 |

OTHER PUBLICATIONS

Mohammed, Nishil, et al., "Cellulose Nanomaterials: Promising Sustainable Nanomaterials for Application in Water/Wastewater Treatment Processes," Environmental Science: Nano, vol. 5, No. 3, pp. 623-658 (2018).

PCT International Search Report and Written Opinion corresponding to International Application No. PCT/US19/48603, dated Oct. 10, 2019.

Antoine, Richard, et al. "Micro-Cellulose Based Water Filtration System," Journal of Undergraduate Chemical Engineering Research, Stony Brook, NY.

Sharma, Priyanka R., et al. "Efficient Removal of $UO_2^{2+}$ from Water Using Carboxycellulose Nanofibers Prepared by the Nitro-Oxidation Method," Industrial & Engineering Chemistry Research, vol. 56, No. 46, pp. 13885-13893 (2017).

Sharma, Priyanka R., et al. "Lead Removal from Water Using Carboxycellulose Nanofibers Prepared by Nitro-Oxidation Method," Cellulose, vol. 25, pp. 1961-1973 (2018).

Varghese, Anitha George, et al., "Remediation of Heavy Metals and Dyes from Wastewater Using Cellulose- Based Adsorbents," Environmental Chemistry Letters, vol. 17, pp. 867-877 (2019).

Voisin, Hugo, et al. "Nanocellulose-Based Materials for Water Purification," Nanomaterials, vol. 7, No. 3, p. 57 (2017).

Wang, Dong. "A Critical Review of Cellulose-Based Nanomaterials for Water Purification in Industrial Processes," Cellulose, vol. 26, pp. 687-701(2019).

* cited by examiner

METHOD FOR NITROGEN REMOVAL AND NITROGEN SALTS RECOVERY USING CARBOXYLATED CELLULOSE EXTRACTED BY NITRO-OXIDATION

CROSS-REFERENCES TO RELATED APPLICATIONS

This application is the U.S. National Phase of, and Applicant claims priority from, International Patent Application Number PCT/US2019/048603, filed on Aug. 28, 2019, which claims priority from U.S. Provisional Application Ser. No. 62/724,129, filed on Aug. 29, 2018, the contents of which are herein incorporated by reference in their entirety.

GOVERNMENT SUPPORT STATEMENT

This invention was made with government support under DMR-1808690 awarded by the National Science Foundation. The government has certain rights in the invention.

BACKGROUND OF THE INVENTION

Treating wastewater to remove contaminants and impurities quickly, efficiently, and economically has been a major challenge for wastewater treatment plants for decades. Standard practices include inducing precipitation of certain materials, filtration, sedimentation, and ion exchange. Coagulation and flocculation are processes that may be used as preliminary or intermediate steps in the wastewater treatment process and involve separating solids from the water. Coagulation involves using particles with charges opposite of the suspended solids to neutralize the charges and form an aggregate, i.e., particles sticking together. Flocculation is a gentle mixing process that causes the particles to collide and form larger particles which are easier to separate from the water.

Coagulation and flocculation processes have become more widely used over the years as the Environmental Protection Agency (EPA) has implemented more stringent requirements for water filtration. There is a growing need for new coagulants that are cost effective, highly efficient, and non-toxic that are made from renewable resources and may be reused or recycled.

SUMMARY OF THE INVENTION

The inventors has discovered that carboxylated cellulose which is an abundant, natural resource that is renewable and recyclable can be used to remove ammonium and nitrogen-containing impurities from contaminated water.

The invention relates to a method of treating contaminated water to remove ammonium and nitrogen-containing impurities and recover ammonium salts including the following steps: (1) exposing contaminated water to carboxylated cellulose comprising negatively charged functional groups which aggregate with positively charged ammonium ions and nitrogen containing impurities in water, to form an aggregate and treated water; (2) separating the aggregate from the treated water; and (3) isolating ammonium salts from the aggregate, wherein the contaminated water comprises ammonium, nitrogen-containing impurities, or combinations thereof.

In a preferred embodiment, the ammonium salts are converted into ammonium sulfates, ammonium phosphates, ammonium nitrites, ammonium nitrates, ammonium hydroxide, or combinations thereof.

The carboxylated cellulose is preferably extracted from a raw or untreated biomass using a nitro-oxidation method. Also, the carboxylated cellulose is preferably in the form of microfibers, nanofibers, or combinations thereof. The carboxylated cellulose is preferably present in a concentration of about 0.05% to about 1% based upon the weight of the contaminated water in step (1) above or step (b) below.

The negatively charged functional groups preferably include —COO⁻, —Cl⁻, —Br⁻, —I⁻, —F⁻, —CH$_2$COO⁻, —SO$_4^{-2}$, or combinations thereof. The ammonium and nitrogen-containing impurities may be present in the contaminated water in about 1 to about 125 ppm.

The invention also relates to a method of making a fertilizer or a fertilizer component from contaminated water including the following steps: (a) exposing contaminated water to carboxylated cellulose comprising negatively charged functional groups which aggregate with positively charged ammonium ions and nitrogen containing impurities in water, to form an aggregate and treated water; and (b) isolating the aggregate to provide a fertilizer or fertilizer component.

Preferably, the aggregate is processed to isolate ammonium salts to provide a fertilizer component. Also preferably, the ammonium salts are converted into ammonium sulfates, ammonium phosphates, ammonium nitrites, ammonium nitrates, ammonium hydroxide, or combinations thereof.

In one embodiment, the aggregate is a slow-release fertilizer.

When the carboxylated cellulose is extracted from a raw or untreated biomass using a nitro oxidation method, the nitrogen and oxygen byproducts produced from the nitro-oxidation method may be converted to nitrate salts and added to the fertilizer or fertilizer component provided in step (b).

DETAILED DESCRIPTION

Figure 1:
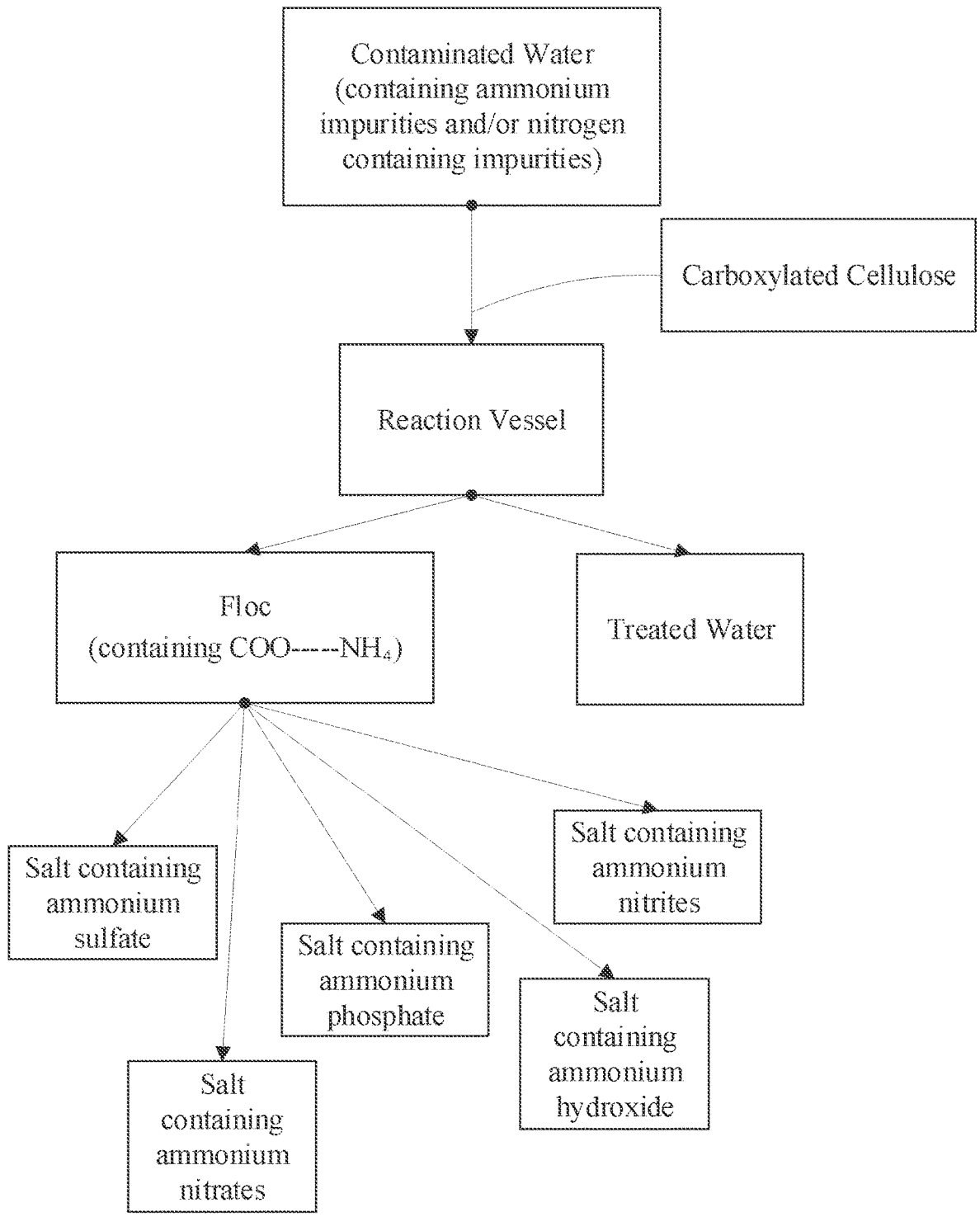
FIG. 1. Schematic of ammonium removal using cellulose nanofibers and recycling of removed ammonium into different fertilizing salts. The floc obtained during to the interaction of carboxylated cellulose (e.g. CNF) and ammonium ions from contaminated water can be recycled back to nitrogen containing salts such as ammonium nitrates, ammonium nitrites, ammonium phosphates, and ammonium sulfates. These salts can be used as fertilizer for plant growth. The conversion process using CNF as an example is schematically shown.

The invention relates to treating contaminated water, typically wastewater, with carboxylated cellulose (e.g., CNF) to remove ammonium and nitrogen-containing impurities. Carboxylated cellulose works well for this use because cellulose is an abundant, natural, renewable resource. Additionally, the impurities can be recovered to provide a fertilizer or fertilizer component.

One aspect of the invention relates to a method of treating contaminated water to remove ammonium and nitrogen-containing impurities. The first step (1) involves exposing contaminated water to carboxylated cellulose. The contaminated water can be any water containing ammonium and nitrogen-containing impurities. For example, the ammonium and nitrogen-containing impurities may be present in the contaminated water in about 1 ppm ammonium or greater. Typically, the contaminated water is wastewater.

The carboxylated cellulose is preferably extracted from a raw or untreated biomass using the nitro-oxidation method. See Sharma, et al. "Nanocellulose from *Spinifex* as an Effective Absorbent to Remove Cadmium (II) from Water", *ACS Sustainable Chem. Eng.* 2018, 6, 3279-3290. The nitro-oxidation method can be applied to any type of biomass from agricultural residuals to wood. Preferably, the biomass may be an underutilized plant source. Examples of the biomass include, but are not limited to, jute, grass, *spinifex*, etc.

Nitro-oxidation involves the mixtures of nitric acid and sodium nitrite to produce negatively charged carboxylated cellulose in the form of microfibers and/or nanofibers. The negatively charged functional groups include, but are not limited to, $-COO^-$, $-Cl^-$, $-Br^-$, $-I^-$, $-F^-$, $-SO_4^{-2}$ and $-CH_2COO^-$. Negatively charged functional groups, e.g. $-COO^-$, are present in the carboxylated cellulose where the degree of oxidation is typically in the range of 0.1 to 2.0 mmol/g.

The negatively charged functional groups can interact with positively charged ammonium ions or nitrogen containing impurities, allowing the cellulose scaffold to form an aggregate. The resulting aggregate or floc from charge interactions of carboxylated cellulose and ammonium or nitrogen containing impurities possesses organic elements from cellulose, hemicellulose, and lignin as well as inorganic compounds such as ammonium salts.

The carboxylated cellulose is preferably added to the contaminated water in a concentration of about 0.05% to about 30% based upon the weight of the contaminated water.

The carboxylated cellulose is exposed to the contaminated water in any way to effectuate the negatively charged functional groups on the carboxylated cellulose to form an aggregate with the positively charged ammonium ions and nitrogen containing impurities in the water. Exposure may include mechanical mixing, propellers, turbines, etc. The duration and conditions, e.g., pH, mixing, and temperature can be determined by a person skilled in the art. For example, the carboxylated cellulose may be exposed to the wastewater as would a coagulant or an adsorbent. The duration of exposure is any amount of time whereby a significant amount of ammonium ions and nitrogen impurities in the water can form an aggregate with the carboxylate cellulose. For example, the exposure time may be about 1 minute to about 72 hours.

The second step (2) involves separating the treated water from the aggregate. This may be accomplished by methods known in the art such as sedimentation, filtration, etc.

The aggregate may be treated with concentrated sodium chloride to regenerate the carboxylated cellulose so it may be used again in the contaminated water treating process. While carboxylated cellulose may be regenerated numerous times with concentrated sodium chloride, it will eventually degrade and need to be replaced with fresh carboxylated cellulose.

Another aspect of the invention relates to a method of treating contaminated water to remove ammonium and nitrogen-containing impurities and to recover ammonium salts. The method includes steps (1) and (2) above and the additional step (3) of isolating ammonium salts from the aggregate. The ammonium salts can be isolated from the aggregate by any method known in the art. For example, the ammonium salts may be separated from the carboxylated cellulose using sodium chloride. The regenerated carboxylated cellulose may then be used again in the process of step (1) to treat contaminated water.

The separated ammonium salts may be converted into ammonium sulfates, ammonium phosphates, ammonium nitrites, ammonium nitrates, ammonium hydroxide, or combinations thereof which can be used as fertilizer components.

Another aspect of the invention relates to a method of making fertilizer from contaminated water including steps (a) through (b). Step (a) corresponds to step (1) as described above. Step (b) involves isolating the aggregate to provide a fertilizer or fertilizer component. The aggregate contains organic elements from cellulose, hemicellulose, and lignin as well as inorganic compounds such as ammonium salts. If the carboxylated cellulose in the aggregate is spent meaning the quality of any regenerated carboxylated cellulose would not be efficient for further removal of ammonium ions and nitrogen containing impurities from wastewater, then the entire aggregate including the cellulose may be used as a fertilizer or fertilizer component.

The aggregate would function as a slow-release fertilizer because it is biodegradable, non-toxic, and loaded with ammonium. When placed in the soil, the ammonium component may slowly enter the soil and potentially reduce nitrogen rich runoff, by releasing the nitrogen more slowly. The cellulose-based adsorbent will further decompose.

Additionally, the floc obtained by the neutralization and precipitation of the effluent in the nitro-oxidation process can possess organic elements from xylose, pentose, mannose (hemicellulose) and phenolic rings (lignin), excessive nitrogen and oxygen (from the nitro-oxidation) that can also be converted into the form of nitrate salts to be used as a fertilizer component.

Examples have been set forth below for the purpose of illustration. The scope of the invention is not to be in any way limited by the examples set forth herein.

EXAMPLES

Example 1. Characterization of Ammonium Adsorption

To test the ammonium adsorption, measurements were carried out using the ammonium ion-selective electrode (ISE) technique. In this test, a probe including the ion-selective field-effect transistor (ISEFET) was used to measure the change in voltage using a gate insulator specific to ammonium. The probe is quantitatively sensitive to the ammonium concentration ranging from 1 ppm to 1000 ppm. The second method used to determine the ammonium concentration included the use of a colorimetric indicator, i.e., Nessler's Reagent/potassium tetraiodomercurate (II). In this method, the mercury compound was coordinated with ammonium and formed a colored complex, which was subsequently measured using ultraviolet-visible spectroscopy (UV-Vis) at 420 nm. The Nessler's reagent was quantitatively sensitive to the change of ammonium concentration in the range of 1-10 ppm.

Figure 2:
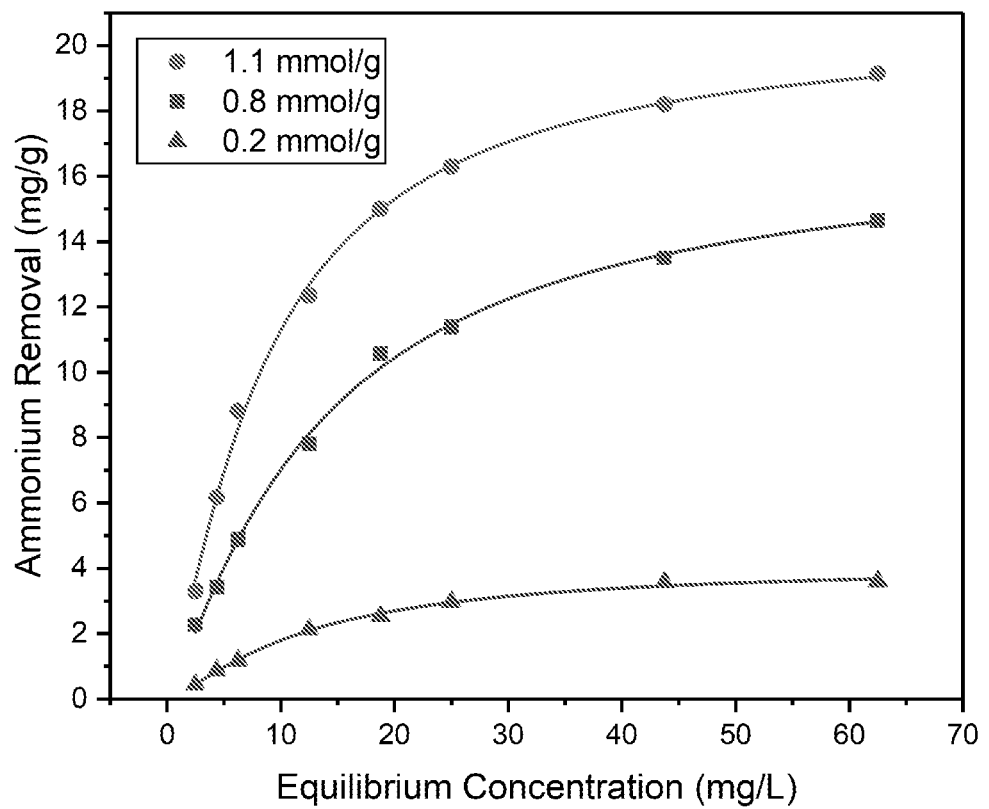
FIG. 2. Removal of mg of ammonium per gram of carboxylated cellulose nanofibers prepared by the nitro-oxidation approach (NOCNF) shown as mg/g and the initial concentration of ammonium in mg/L.

A wide range of ammonium concentrations could be removed from water and the results are shown in FIG. 2. In this study, the ammonium solutions were prepared by dissolving ammonium chloride in de-ionized water. Using the initial ammonium concentration ranging from 1-125 ppm, the ammonium removal capacity of CNF was found to exhibit a power function relationship with the equilibrium ammonium concentration.

Concentration Study.

The adsorption capacity of ammonium using NOCNF was studied using ammonium chloride. Equal parts of NOCNF were added to solutions of ammonium chloride ranging from an initial concentration of 5 to 125 ppm ammonium. FIG. 2 shows the adsorption capacity of NOCNF; on the y-axis mg of ammonium adsorbed per gram of NOCNF (mg/g) over ammonium concentration shown as the equilibrium concentration of the combined NOCNF and ammonium on the x-axis. As the equilibrium concentration is increased, the adsorption dramatically increases until an inflexion point. This is driven by the concentration of ammonium. As the concentration increases, there are more opportunities for ammonium to interact with the carboxylate group of the NOCNF. The adsorption follows a Langmuir isotherm, which describes monolayer adsorption. This is in agreement with NOCNF, as all carboxylates groups are on the surface.

Degree of Oxidation.

Figure 3:
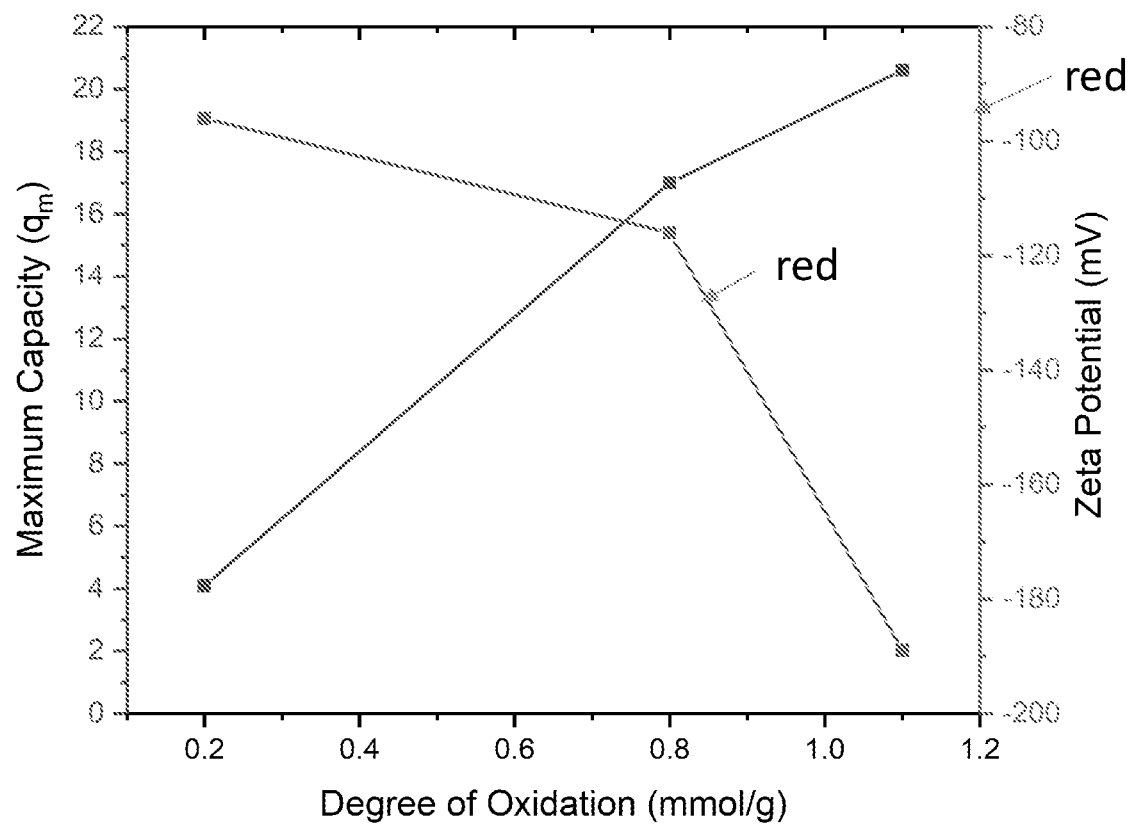
FIG. 3. Maximum adsorption capacity ($q_m$) and zeta potential (mV) (red) over NOCNF samples of different Degree of Oxidations.

Degree of oxidation (DO) is expressed as the amount of oxidized functional groups, in this case carboxylic acid, per mass of product, and can be expressed as mmol of carboxylic acid per gram of NOCNF. If the mechanism of ammonium removal is through interaction with carboxylate groups, one would expect to see some differences in NOCNF with different DOs. From FIG. 2, NOCNF with different DOs are indicated by the legend ranging from 0.2-1.1 mmol/g. As the DO is increased, removal of ammonium increases. FIG. 3 shows increasing maximum capacity of NOCNF as a function of DO. Furthermore, there seems to be a general linear trend of ammonium removal and DO. This provides good evidence that the carboxylate is the major contributor for ammonium adsorption and that adsorption may be tuned via concentration of carboxylate groups.

Surface Charge.

The mechanism of adsorption is thought to be from the negative charge of the carboxylate group to electrostatically attract a positive cation, such as ammonium. FIG. 3 shows the maximum capacity and respective zeta potential over different DOs of NOCNF. Zeta potential is a measure of electrical potential at the electrochemical transition between the charged surface and diffuse layer. The average negative potential between the surface ions of NOCNF and surrounding solvent may be attributed to the carboxylate groups on the surface of NOCNF. There is a general trend that increasing DO yields increasingly negative zeta potential and increasing maximum capacity for ammonium.

pH.

Figure 4:
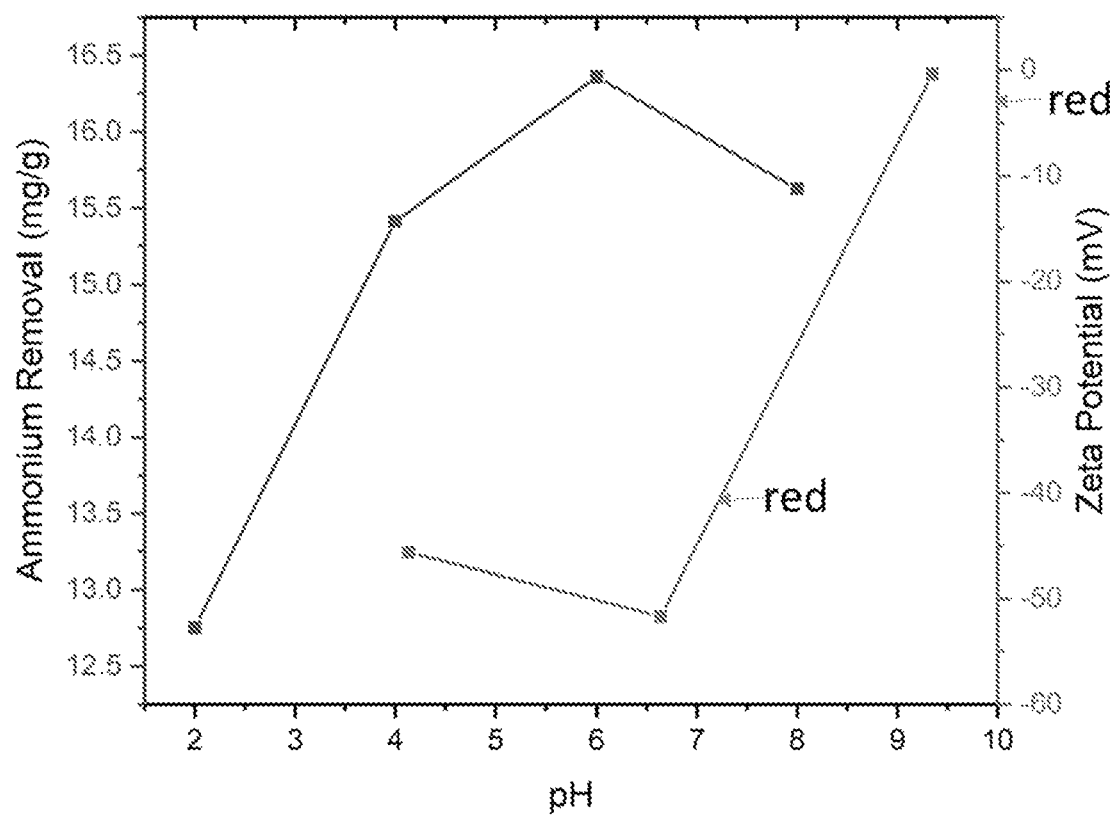
FIG. 4. Adsorption capacity of ammonium and zeta potential (red) over different pH conditions.

FIG. 4 shows the adsorption capacity of NOCNF as the pH is changed. The largest adsorption occurs at a pH value of 6.0, where at an equilibrium concentration of 62.5 mg/L, NOCNF adsorbed 17.8 mg/g. The adsorption efficiency decreases as the pH value is either lowered or increased, indicating a slightly acidic solution promotes the adsorption of ammonium onto the surface of NOCNF. This may represent the equilibrium of —COOH and —COO⁻, commonly reported for ion exchange resins. At a lower pH the carboxylate is protonated, and at a higher pH NOCNF may be degraded, in addition to ammonium being deprotonated. At pH=6.0, ammonium can best exchange with competing ions onto the surface of NOCNF. Low pH conditions also create protons which may compete with ammonium, and chlorine ions which may shield the charge of NOCNF. A similar scenario exists at high pH; sodium competes with ammonium and hydroxide shields the charge of NOCNF. The pH study was restricted to pH=8 and below to avoid converting ammonium to ammonia and potentially losing the species as a gas. When working with ion exchange resins, the recommended working pH is in between the pKa of the exchanger and exchanged ion. From titration, the pKa of NOCNF is calculated to be 4.9, while the pKa of ammonium is 9.3. Ammonium removal if effective from a pH range of 4-8. While the pH of waste water can fluctuate, a stable effective range of 4-8 allows for some wiggle room.

Figure 5:
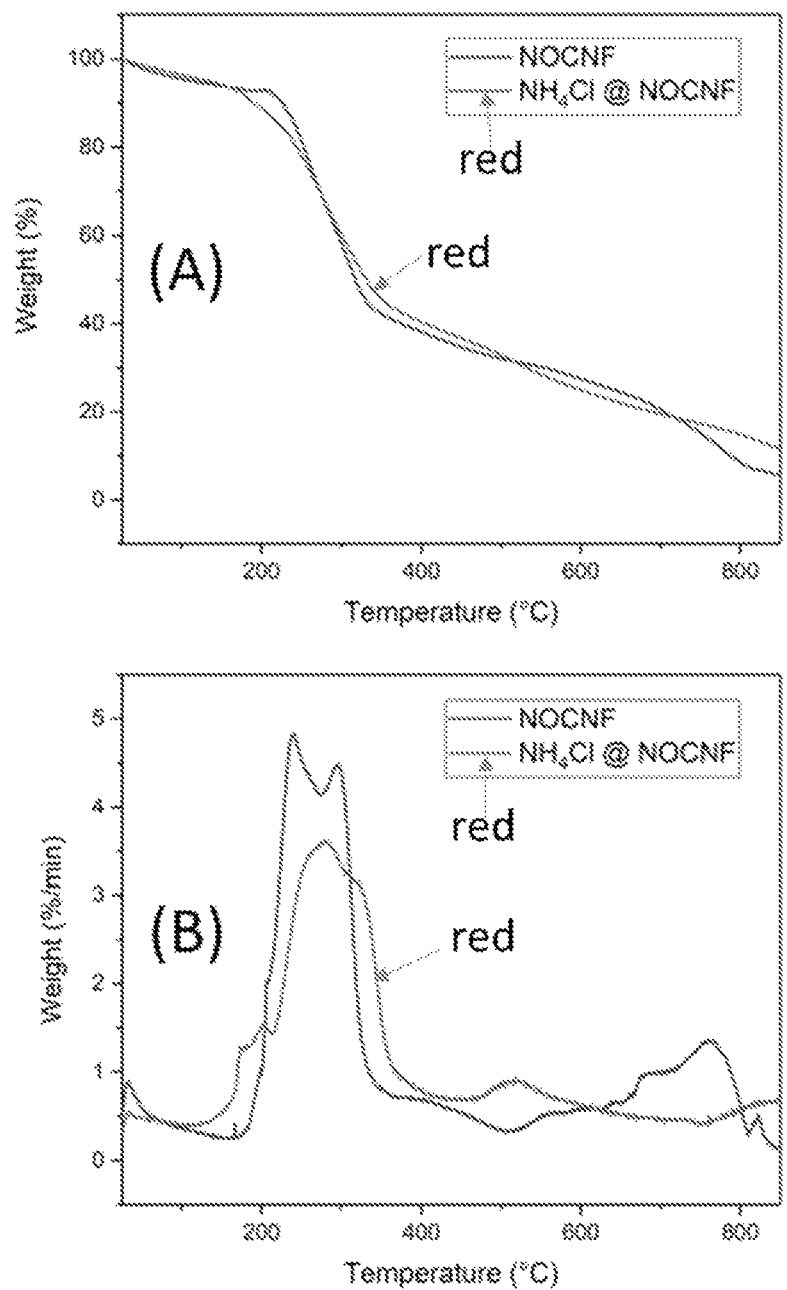
FIG. 5. TGA of NOCNF and NOCNF with 125 ppm ammonium shown as (A) weight % over temperature and (B) weight %/min over temperature.
Figure 6:
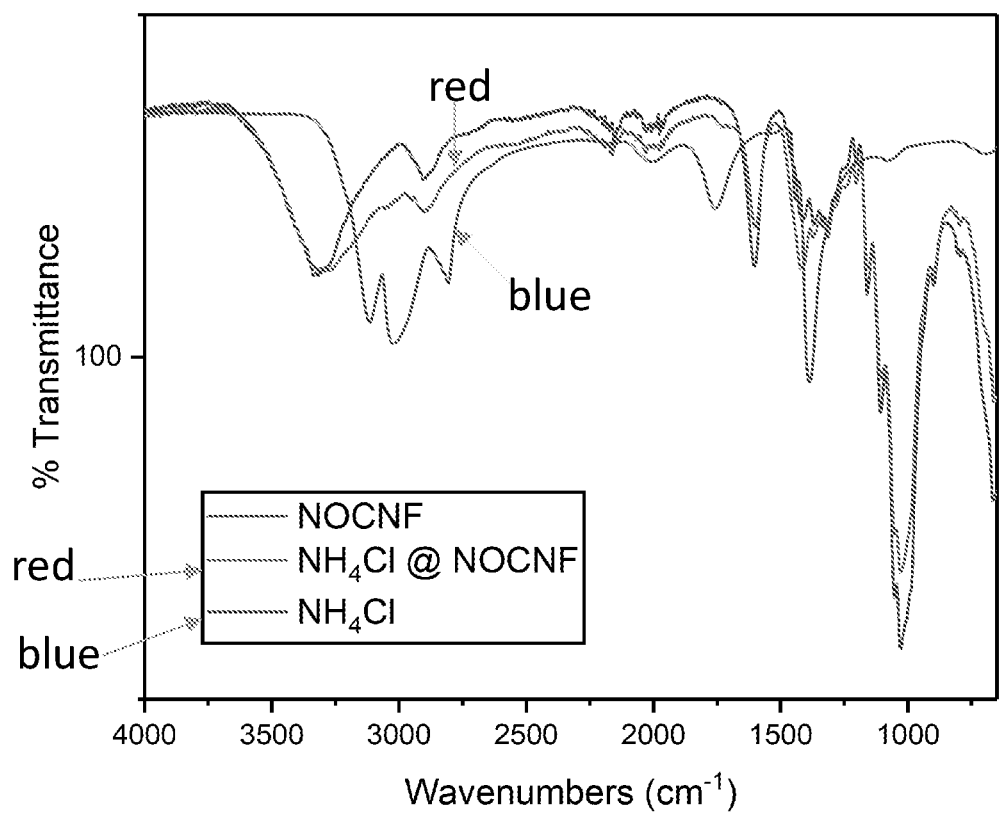
FIG. 6. FTIR of NOCNF (black), NOCNF with 125 ppm ammonium (red), and ammonium chloride (blue).

In FIG. 5, the black curve represents NOCNF and red curve NOCNF with 125 ppm adsorbed ammonium. From NOCNF, there is a $T_{onset}$ temperature of degradation at 178° C. This initial degradation may come from the anhydroglucuronic acid units, as the carboxylate groups are less stable and provide thermal instability. The anhydroglucuronic acid unit degradation results in 21% loss in weight. The initial degradation at 178° C. partially shrouds the next degradation peak at 270° C. The second degradation results in a weight loss of 31%. The degradation at higher temperatures may come from high molecular weight lignin which may be heavily crosslinked. In NOCNF with ammonium. The $T_{onset}$ occurs at 120° C. This is the degradation of ammonia. The respective 10% weight loss is due to the hydrogel properties of NOCNF. Most of its mass comes from water, which may contain ammonium chloride. Upon drying of the sample, ammonium chloride trapped in the swollen hydrogel is left behind. This is followed by the degradation of anhydroglucuronic acid unit for about 48% weight loss. The two peaks in differential TGA may reflect the difference in thermal stability of the carboxylated and uncarboxylated cellulose monomers. After treatment with ammonium, the ammonium may decompose before the carboxylate groups, shifting the degradation point to a slightly higher temperature.

TABLE 1

Degradation temperatures and respective location.

| Sample | $T_{onset}$ (° C.) | Ammonium (° C.) | Glucuronic acid (° C.) | D-glucose (° C.) | High molecular weight lignin (° C.) |
|---|---|---|---|---|---|
| NOCNF | 165 | — | 238 | 293 | 500 |
| NOCNF + ammonium | 123 | 204 | 280 | 318 | 505 |

From the FTIR, there are observed peaks at 3339 cm⁻¹ from O—H stretch of the hydroxyl groups on cellulose. The 2894 cm⁻¹ is from a C—H stretch along the glucose ring. The C=O stretch at 1602 cm⁻¹ is a result of the carboxylic group formed by the nitro oxidation. From previous literature, this peak is not seen in the untreated jute fibers. Peaks at 3019 cm⁻¹ and 1756 cm⁻¹ from ammonium chloride are seen in the sample of NOCNF and ammonium as small shoulders, indicating the presence of ammonium chloride.

TABLE 2

Bond stretches for NOCMF, NOCNF with ammonium chloride, and ammonium chloride.

| Sample | O—H Stretch (cm$^{-1}$) | N—H Stretch (cm$^{-1}$) | C—H Stretch (cm$^{-1}$) | C═Stretch (cm$^{-1}$) |
|---|---|---|---|---|
| NOCNF | 3284-3343 | — | 2901 | 1603 |
| NOCNF + Ammonium | 3288-3340 | 3019 | 2901 | 1601 |
| Ammonium | — | 3019 | — | — |

Elemental analysis was conducted on four samples of NOCNF. A sample of NOCNF was compared to samples of NOCNF with the addition ammonium chloride. The NOCNF sample had no measurable amount of nitrogen, while the samples with ammonium chloride had increasing amounts of nitrogen which correlated with increasing amount of ammonium chloride added to each sample. EA is another qualitative indicator, that ammonium adsorption capacity increases with initial concentration. The percentage of carbon ranges from 38.4-41.6%, and generally decreases with increasing nitrogen because relative concentrations of the two tend to be inversely related.

TABLE 3

Elemental analysis of NOCNF and NOCNF with variable concentrations of ammonium chloride solutions.

| Sample | N (%) | C (%) |
|---|---|---|
| NOCNF | 0.00 | 39.80 |
| NOCNF + 5 ppm $NH_4^+$ | 0.09 | 41.60 |
| NOCNF$^+$ 25 ppm $NH_4^+$ | 0.47 | 39.60 |
| NOCNF + 125 ppm $NH_4^+$ | 2.17 | 38.40 |

Example 2. Treating Contaminated Water

In the lab, an NOCNF suspension of 0.1-0.2 wt. % is combined with a solution of ammonium chloride (1-125 ppm) in a 1:1 ratio. It is then thoroughly mixed to ensure good interaction. After one hour, the NOCNF shows gelation, and is centrifuged to ensure complete separation from solution.

In an industrial scale, micro sized NOCNF is placed in a filter housing unit. As the wastewater passes through the NOCNF, ammonium is removed by the NOCNF, and water passes through. The filter unit keeps the NOCNF in place. The filter unit is flexible, and may include trickling filters, sand filters, and textile filters.

In another industrial method, micro sized NOCNF is mixed with wastewater in two stages: rapid mixing and slow mixing. Rapid mixing serves to disperse the NOCNF evenly throughout the wastewater, After rapid mix, a longer period of slow mixing (gentle agitation) is used to promote the growth of NOCNF-ammonium floc (flocculation). After flocculation, the water suspension flows into the sedimentation tanks.

Example 3. Separating Ammonium Salts from Aggregate (Floc)

Once the NOCNF is saturated with ammonium, it can be removed and used as a fertilizer, or it may be regenerated for further use. NOCNF functions as an ion exchanger. On its first use, the counter ion exists as sodium. NOCNF has a greater affinity for ammonium than sodium, which is why removal of ammonium is observed. To remove the ammonium, a concentrated solution of sodium chloride must be passed through the NOCNF. This method uses high concentration to overcome the higher affinity. Another method is the use of acids and/or bases. From FIG. 4, the removal efficiency of NOCNF is intrinsically related to pH. If the pH is sufficiently acidic or basic, NOCNF will lose its surface charge and release ammonium.

Example 4. Making a Fertilizer

Eventually, the efficiency of the carboxylated cellulose will decrease due to natural degradation, even after regeneration. At this stage, the carboxylated cellulose is removed from for the filter housing and allowed to dry. Once sufficiently dried, the ammonium loaded carboxylated cellulose is laid and sowed over soil. The ammonium loaded carboxylated cellulose can then slowly release the ammonium into soil and fertilize plants. The carboxylated cellulose will then degrade in the soil. Compared to traditional fertilizer, which is applied at once, the ammonium loaded carboxylated cellulose will release more slowly and decrease nitrogen rich runoff.

The invention claimed is:

1. A method of treating contaminated water to remove ammonium and nitrogen-containing impurities and recover ammonium salts comprising:
    (1) exposing contaminated water to cellulose processed by nitro-oxidation which aggregate with positively charged ammonium ions and nitrogen containing impurities in water, to form an aggregate and treated water;
    (2) separating the aggregate from the treated water; and
    (3) isolating ammonium salts from the aggregate, wherein the contaminated water comprises ammonium, nitrogen-containing impurities, or combinations thereof; and
    the cellulose comprises negatively charged functional groups comprising —COO$^-$, —Cl$^-$, —Br$^-$, —I$^-$, —F$^-$, —CH$_2$COO$^-$, —SO$_4^{-2}$, or combinations thereof.

2. A method according to claim 1, wherein the ammonium salts are converted into ammonium sulfates, ammonium phosphates, ammonium nitrites, ammonium nitrates, ammonium hydroxide, or combinations thereof.

3. A method of making a fertilizer or a fertilizer component from contaminated water comprising:
    (a) exposing contaminated water to cellulose comprising negatively charged functional groups which aggregate with positively charged ammonium ions and nitrogen containing impurities in water, to form an aggregate and treated water; and
    (b) isolating the aggregate to provide a fertilizer or fertilizer component;
    wherein the negatively charged functional groups comprise —COO$^-$, —Cl$^-$, —Br$^-$, —I$^-$, —F$^-$, —CH$_2$COO$^-$, —SO$_4^{-2}$, or combinations thereof.

4. A method according to claim 3, wherein the aggregate is processed to isolate ammonium salts to provide a fertilizer component.

5. A method according to claim 4, wherein the ammonium salts are converted into ammonium sulfates, ammonium phosphates, ammonium nitrites, ammonium nitrates, ammonium hydroxide, or combinations thereof.

6. A method according to claim 3, wherein the aggregate is a slow-release fertilizer.

7. A method according to claim 1, wherein the cellulose is extracted from a raw or untreated biomass.

8. A method according to claim 1, wherein the cellulose is in the form of microfibers, nanofibers, or combinations thereof.

9. A method according to claim 1, wherein the cellulose is present in a concentration of about 0.05% to about 1% based upon the weight of the contaminated water.

10. A method according to claim 1, wherein ammonium and nitrogen-containing impurities are present in the contaminated water in about 1 to about 125 ppm.

11. A method according to claim 3, wherein the cellulose is extracted from a raw or untreated biomass using a nitro oxidation method and wherein nitrogen and oxygen byproducts produced from the nitro-oxidation method are converted to nitrate salts and added to the fertilizer or fertilizer component provided in step (b).

12. A method according to claim 3, wherein the cellulose is extracted from a raw or untreated biomass using a nitro-oxidation method.

13. A method according to claim 3, wherein the cellulose is in the form of microfibers, nanofibers, or combinations thereof.

14. A method according to claim 3, wherein the cellulose is present in a concentration of about 0.05% to about 1% based upon the weight of the contaminated water.

15. A method according to claim 3, wherein ammonium and nitrogen-containing impurities are present in the contaminated water in about 1 to about 125 ppm.

\* \* \* \* \*

UNITED STATES PATENT AND TRADEMARK OFFICE
CERTIFICATE OF CORRECTION

| | | |
|---|---|---|
| PATENT NO. | : 12,122,687 B2 | Page 1 of 1 |
| APPLICATION NO. | : 17/267683 | |
| DATED | : October 22, 2024 | |
| INVENTOR(S) | : Benjamin S. Hsiao et al. | |

It is certified that error appears in the above-identified patent and that said Letters Patent is hereby corrected as shown below:

In the Specification

<u>Column 7, Table 2:</u>
Now reads: Bond stretches for NOCMF
Should read: Bond stretches for NOCNF <u>Column 7, Table 2:</u>
Now reads: C=Stretch
Should read: C=O Stretch Signed and Sealed this
Tenth Day of February, 2026

John A. Squires
*Director of the United States Patent and Trademark Office*